United States Patent

Calvé et al.

[11] Patent Number: 5,951,795
[45] Date of Patent: Sep. 14, 1999

[54] METHOD OF MAKING A SMOOTH SURFACED MAT OF BONDED WOOD FINES USED IN PANEL MANUFACTURE

[75] Inventors: Louis Calvé, Cap-Rouge; Marcel Lefebvre, Les Saules, both of Canada

[73] Assignee: Forintek Canada Corp., Quebec, Canada

[21] Appl. No.: 08/878,746

[22] Filed: Jun. 19, 1997

[51] Int. Cl.⁶ .................................................. B32B 21/12
[52] U.S. Cl. ...................................... 156/62.8; 264/112
[58] Field of Search .................. 156/62.2, 62.8, 156/324.4, 296, 324; 264/113, 119, 122, 437, 109, 112; 425/80.1, 81.1, 82.1; 162/13, 130, 132, 206, 225

[56] References Cited

U.S. PATENT DOCUMENTS

| | | |
|---|---|---|
| 2,343,740 | 3/1944 | Birmingham . |
| 2,419,614 | 4/1947 | Welch . |
| 3,308,013 | 3/1967 | Bryant . |
| 4,271,105 | 6/1981 | De Mets et al. ..................... 264/113 |
| 4,315,965 | 2/1982 | Mason et al. ........................ 264/119 |
| 4,361,612 | 11/1982 | Shaner et al. . |
| 4,364,984 | 12/1982 | Wentworth . |
| 4,425,126 | 1/1984 | Butterworth et al. ............... 264/119 |
| 4,883,546 | 11/1989 | Kunnemeyer . |
| 5,425,976 | 6/1995 | Clarke et al. . |
| 5,470,631 | 11/1995 | Lindquist et al. . |
| 5,506,026 | 4/1996 | Iwata et al. . |
| 5,525,394 | 6/1996 | Clarke et al. . |

FOREIGN PATENT DOCUMENTS

| | | |
|---|---|---|
| 2097275 | 10/1994 | Canada . |
| 2140319 | 7/1996 | Canada . |
| 2039559 | 11/1996 | Canada . |

OTHER PUBLICATIONS

"Overlay Problems with OSB Core", Calve and Lefebvre, 1996 Plastic Laminates Symposium, Aug. 19–22, 1996.

*Primary Examiner*—Michael W. Ball
*Assistant Examiner*—Barbara J. Musser
*Attorney, Agent, or Firm*—Barnes & Thornburg

[57] ABSTRACT

Smooth surfaced panels e.g. of oriented strand board are prepared by producing a thin uniform mat of high density made from bonded wood particles, fibers or strands. The mat is produced by passing it between a pair of rollers one of which is heated to produce a smooth cured surface on the corresponding side of the mat, and the other of which is unheated, the corresponding side of the mat containing uncured adhesive. The mat is subsequently bonded to a panel, e.g. an oriented strand board core under conditions of heat and pressure to produce a composite panel having a smooth surface.

17 Claims, 4 Drawing Sheets

TABLE 1

SAW EDGE INTEGRITY OF LAMINATED OSB PANELS MADE OF STRANDS OF DIFFERENT THICKNESSES
(WITH AND WITHOUT PRE-PRESSED FINES)

| STRAND THICKNESS (mm) | TOTAL FINES CONTENT (%) | VISUAL CLASSIFICATION NO. SAW EDGE INTEGRITY |
|---|---|---|
| 0.76 (poplar) | 0 | 6 |
| | 20 | 4 |
| | 20 (PRE-PRESS) | 2 |
| | 50 | 3 |
| 0.38 (POPLAR) | 0 | 5 |
| | 20 | 4 |
| | 20 (PRE-PRESS) | 2 |
| 0.50[1] | 50[1] (PRE-PRESS) | 2 |
| PARTICLEBOARD | | 2 |
| MDF | | 1 |

[1] STRANDS AND FINES MADE FROM WHITE BIRCH

FIG. 3

TABLE 2

SURFACE PROFILE MEASUREMENTS OF OSB PANELS MADE FROM STRANDS
OF DIFFERENT THICKNESSES (WITH AND WITHOUT PRE-PRESSED FINES)

| STRAND THICKNESS (mm) | OSB FINES ADDITION (%) | PRE-PRESS CYCLE (sec) | TIME ELAPSED PRIOR TO FINAL PRESSING (h) | IB CORE FAILURE (%) | VISUAL CLASSIFICATION No. | | 21°C, 50% RH RECORDED PROFILE (1000X) | |
|---|---|---|---|---|---|---|---|---|
| | | | | | TOP | BOTTOM | TOP | BOTTOM |
| 0.76 | 20 | 0 | - | | 4 | 5 | | |
| | 20 | 30 | 5 | | 2 | 2 | | |
| | 50 | 30 | 5 | 100 | 2 | 2 | | |
| | | 120 | 100 | | 2 | 2 | | |
| 0.38 | 20 | 30 | 0 | | 2 | 2 | | |
| PARTICLEBOARD | | | | | 2 | 2 | | |

FIG. 4

TABLE 3

SURFACE CHARACTERISTICS OF LAMINATED OSB PANELS AFTER ACCELERATED AGING

| STRAND THICKNESS (mmm) | TOTAL FINES CONTENT (%) | STEAM PRESSING (sec) | VISUAL CLASSIFICATION No. SMOOTHNESS, 50°C - 90% RH | | | RECORDED PROFILE (1000X) |
|---|---|---|---|---|---|---|
| | | | 0h | 50h | 140h | |
| 0.76 | 0 | | 6 | 6 | 7 | |
| | 40 (PRE-PRESS) | x | 2 | 2 | 3 | |
| 0.38 | 40 (PRE-PRESS) | | 2 | 3 | 3 | |
| 0.50[1] | 50[1] (PRE-PRESS) | x | 2 | 3 | 3 | |
| PARTICLEBOARD | | | 2 | 3 | 3 | |
| MDF | | | 1 | 2 | 2 | |

[1] STRANDS AND FINES MADE FROM WHITE BIRCH

FIG. 5

METHOD OF MAKING A SMOOTH SURFACED MAT OF BONDED WOOD FINES USED IN PANEL MANUFACTURE

BACKGROUND OF THE INVENTION a) Field of the Invention

This intention relates to a new or improved process for producing smooth surfaced oriented strand board (OSB) panels. It also relates to a new or improved process for producing a thin and uniform mat of high density made of bonded wood particles, fibres or strands. The thin mat is produced with an uncured adhesive on one of its surfaces and a completely cured adhesive on the other surface. The thin mat could thus be bonded to another mat or to any other substrate (e.g. wood door core)in a one step pressing operation. The end product has a smooth and uniform surface, which could be painted or laminated. This invention, although more documented for OSB, is not limited to OSB panels as it could be employed to improve the surface quality of any type of panel or substrate. This approach could be employed for example to obtain a higher surface density (higher bending properties) with MDF or particleboard panels. Better surface quality will allow improved mechanical properties or allow a reduction of expensive adhesive needed to obtain panels of high mechanical properties.

b) Description of the Prior Art

OSB panels have found widespread application in the building industry, e.g. for use as sheathing and flooring in residential and other structures. OSB panels have numerous advantages compared with other wood based panels. For example, they are lower in cost and provide greater versatility in size than plywood panels.

As compared to particleboard panels, OSB panels possess many desirable properties, such as: high bending strength; high rigidity; and low linear expansion. Since OSB is bonded with phenolic or isocyanate resin, it is resistant to water hydrolysis and it does not have any significant formaldehyde emission problems.

Apart from its traditional uses in the construction of walls, roofs, floors and as a sheathing material, OSB could potentially also be employed as a substrate for lamination, at least in specialty applications where its superior mechanical properties are required.

It has been recognized that an OSB panel having a smooth surface or overlay could be sold at a substantially higher price in comparison to a regular OSB panel, and numerous efforts have been made to produce such a smooth surfaced panel and thus expand the market for OSB panels. Various commercial products have appeared in which OSB panels are coated e.g. with an overlay of fine particles or of fibre, but none has been entirely successful. One method (U.S. Pat. No. 5,425,976; 1995) consisted of the utilization of wood strands of higher density (450 kg/m$^3$ to 600 kg/m$^3$) which are difficult to compress. During pressing, the stiff strands in the OSB baseboard would force the overlaying fibre to take up most of the compaction. This method may reduce the areas of low density at the panel surface but fail to eliminate the problem. Low density areas at the panel surface are still present. Furthermore, since trembling aspen employed in most Canadian OSB mills has an oven-dry density of approximately 424 kg/m$^3$, this process would have limited use. A multilayer panel using a gradation of OSB strands, slivers and fines has also been described to help prevent telegraphing and reducing sieving of the fines through the mat (U.S. Pat. No. 4,364,984; 1982). This method may reduce the number of sites with low density areas, but these are not eliminated. Areas of low density are still present, particularly in the panel top surface of panels due to sieving of the small fines particles through the mat which occurs especially when the mat is transported to the press on a moving line in a mill operation. Pre-pressing at ambient temperature has also often been suggested to densify the fines or fibres and improve surface quality (U.S. Pat. No. 2,343,740; 1944; U.S. Pat. No. 3,308,013; 1967; U.S. Pat. No. 4,883,456; 1989). Cold pre-pressing however provides limited compaction and requires high tack adhesives which are generally avoided in OSB mills due to potential build up in the blender and processing line.

In the course of this work, a technique for pre-pressing resinated fines between hot and cold platens was developed. The resulting thin mat was cured on the outside face, but not on the inside, so that it could be laminated onto an OSB mat prior to pressing. The process is quite forgiving and produces high density uniform and smooth surfaces, suitable for painting or lamination using less fines. Improved "saw cut" edges were also obtained using this approach.

SUMMARY OF THE INVENTION

The invention provides a method for producing a smooth-surfaced uniform mat of high density made from bonded wood fines selected from particles, fibers and strands, said method comprising: mixing said fines with an adhesive to provide a mixture, and spreading said mixture to form a generally uniform layer mat; said layer by pressing one surface of said uniform layer mat against a smooth-surfaced heated element under conditions where the resin on and adjacent said one surface is cured while the resin on and adjacent the opposite surface of the mat remains uncured.

From another aspect the invention provides a high density uniform mat of bonded wood fines selected from particles, fibers or strands mixed with an adhesive, adhesive on or adjacent one side of said mat being in cured condition, said side having a high degree of smoothness; adhesive in said mat on or adjacent the opposite side of said mat remaining uncured.

The invention further provides a method for producing an oriented strand board panel with a surface having a high degree of surface smoothness, comprising the steps of:

a) producing a first mat of oriented strand board of predetermined thickness;

b) producing a second mat of fines and resin, said second mat being of lesser thickness than said first mat;

c) pressing said second mat with the application of heat to one side thereof to produce a smooth surface on said one side, and to cure resin at and adjacent said one side while resin at and adjacent the opposite side remains uncured and reactive;

d) applying said second mat from step c) with said opposite side thereof against one side of said first mat under conditions of pressure and heat to effect bonding together of said two mats and curing of resin therein to create a laminated panel.

Preferably, a fines mat is applied to both sides of the OSB panel, so that both surfaces of the latter are smooth.

The first (OSB) mat has a resin content of 0.5 to 15% preferably 2–3% and preferably comprises strands e.g. of 0.20 to 1.0 mm thickness, 25 mm to 300 mm length and 10 mm to 50 mm width. The fines may be of the same wood as the strands or of different wood species, and 20% to 100% of the fines have a size that is smaller than 850 µm. Preferably 40% or more of the fines have a size smaller than 850 μm. Larger particle could be used but the surface would not be as smooth. The fines mat or mats will have a resin content (e.g. phenolic resin) similar to or higher than the first (OSB) mat, e.g. about 2% to 12% preferably 5% to 8% for the wood particles smaller than 850 μm.

The fines mat could be produced in a conventional batch press but is preferably produced on a continuous basis by passing it between a pair of pressure rollers, one of which is heated and cures the resin in and adjacent the corresponding surface of the fines mat, producing a smooth surface therein. For example, the heated roller may be at a temperature of 150° C. to 230° C. whereas the opposite roller is unheated, having a temperature kept at 50° C. to 80° C. so that the resin of the corresponding side of the fines mat remains uncured until the subsequent laminating step.

The fines content of the finished laminated panel will be at least about 15% by weight for thicker panels up to about 30% by weight for thinner panels.

BRIEF DESCRIPTION OF THE DRAWINGS

The invention will further be described, by way of example only, with reference to the accompanying drawings in which:

FIG. 3 (Table 1) is a table setting forth the values for saw edge integrity of laminated OSB panels made of strands of different thicknesses;

FIG. 4 (Table 2) is a table setting forth the surface profile measurements of OSB panels made from strands of different thicknesses; and FIG. 5 (Table 3) illustrates the surface characteristics of laminated OSB panels after accelerated aging.

DESCRIPTION OF THE PREFERRED EMBODIMENTS

Experimental work was done on laboratory sized panels measuring 61 cm×61 cm under the following conditions
Furnish: Trembling aspen strands
  150 mm×38 mm×0.76 mm
  150 mm×38 mm×0.38 mm
  25 mm×19 mm×0.38 mm
  850 μm particles
  White birch strands
  150 mm×38 mm×0.50 mm
  850 μm particles
Face/core ratio: 0/100; 20/80; 40/60; 50/50
Resin content: 8% PF (phenolic resin) on face particles;
  2.25% PF on strands
Panel thickness: 15.9 mm
Total press cycle: 6 minutes
Replicates: 3

In the forgoing, the fines used had a size smaller than 850 μm and all furnish was treated with 1% slack wax prior blending with the PF resin. The laboratory panels were prepared with and without (61 cm×61 cm dimension) steam injection pressing. Steam pressing was employed to improve the dimensional stability of the panels (U.S. Pat. No. 5,028, 286). For steam pressing of panels, a pressure of 1.1 MPa was used with the following sequence; 30 s press closing, 45 s steam injection, 15 s steam release, 115 s steam injection and 30 s steam release.

For the pre-pressing of fines, material were treated with 1% wax and 8% PF resin. Pre-pressing was achieved by a conventional pressing technique except that only the top press platen was heated (215° C.) while the bottom press platen was kept at 20° C. The resinated fines were pre-pressed for 30 s or 120 s at 6.9 MPa. An OSB mat was then sandwiched between two pre-pressed sheets and consolidated in a press using conventional hot pressing technology. For a 15.9 mm thick panel, the final thickness of the compressed fines was estimated to be approximately 1.6 mm (surface or bottom layer only) for a total fines content of 20%; similarly 2.5 mm layers were equated to 35% and 3.8 mm layers were equated to 50%.

Figure 2:
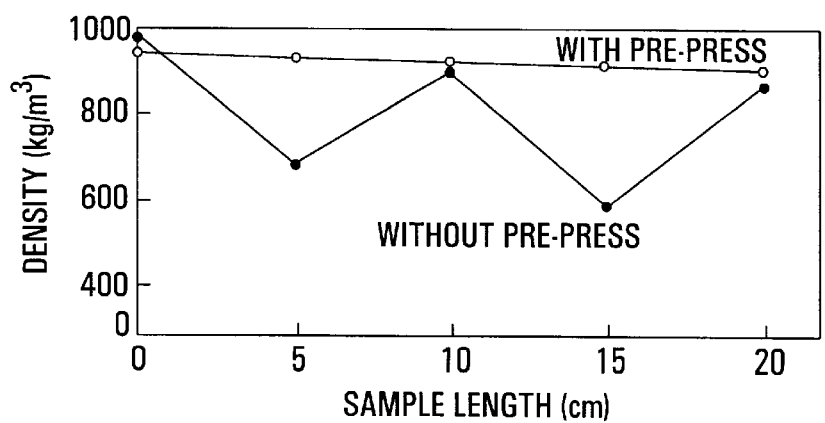
FIG. 2 is a graph showing the variation of surface density of the fines on an OSB panel surface.

The results of surface density variations of fines on OSB panels pressed with addition of 20% fines, with and without pre-pressing the fines, are shown in FIG. 2. It can be seen that without pre-pressing, large density variations occur which are not present for the pre-pressed panels. In fact without pre-pressing some of the fines could be easily removed from the surface by simply scratching the surface with a dull knife.

Referring now to FIG. 3 (Table 1) saw edge integrity is an indication of quality of laminate. It is clear that better results would be obtained with a saw especially designed to cut melamine overlay, i.e., a two blade arrangement rotating in opposite direction. In this study, panels were cut purposely using a single rotation saw to obtain additional information on the quality of the melamine-wood bond. The edges of fresh cut samples were examined and classified 1 to 10 based on visual examination. A classification 1 was given to samples which showed a sharp edge without breakage or chipping of the melamine papers and a classification 2 showed a slightly less sharp edge. Table 1 shows the edge integrity visual classification for OSB panels made from 0.76 mm and 0.38 mm aspen and 0.50 mm birch, with and without addition of fines and pre-pressing. As shown in Table 1, only the pre-pressing technique produces panels with sharp edges similar to particleboard. Pre-pressing eliminates low density areas where particles are not bonded properly.

The results of testing of the panels produced above for surface smoothness are set forth in tabular form in FIGS. 4 and 5 (Tables 2 and 3) which include for comparison the surface smoothness integrity characteristics of a particleboard sample. Surface smoothness measurements were taken using a Mitutoyo Curftest 201 (Trademark) with a magnification of 1000X. Samples sections (25.5 cm×9.5 cm) of test panels were evaluated after conditioning for 120 h at 21° C. and 50% RH (relative humidity) (Table 2) or 50 h and 140 h at 50° C. and 90% RH (Table 3). Trace elements of the Curftest 201 are shown at the right in Table 2 and 3, the stylus of the Curftest 201 travelling 1.25 cm per trace. In order to identify surface imperfections, actual trace measurements of selected, representative, problem areas were recorded. Additionally, the surface of each panel was visually inspected under an index light and subjectively classified on a scale of 1 to 10, 1 being a sample with a smooth surface as obtained for commercial sanded MDF, 2 being the slightly rougher surface produced on commercial particleboard, and 10 being the characteristic surface of a sanded OSB produced from 0.76 mm thick strands with large unfilled voids. These observations are recorded under "Visual Classification No" in Table 2 and 3. In this visual inspection, classification 1 was given to a smooth, mirror-type defect free surface. Slight fibre or fine wood particle "show through" resulted in a classification of 2 or 3, while any waviness due to uneven strand swelling, or "telegraphing" of strands was given a higher classification. For furniture applications, a classification of 1–2 (prior accelerated aging) would be desirable for panels made with a semi-gloss finish, whereas for lower quality finished requirements, such as for shelving panels, a classification of 3 (prior to accelerated aging) would be acceptable.

In Table 2 the column headed "IB Core Failure" represents a test of the samples for internal bond strength (IB). All samples were found to break in the middle layer between the strands. No breakage was observed between the mats of pre-pressed fines and the central strand mat even when the pre-press cycle varied from 30 seconds to 120 seconds.

As Table 2 shows, all samples tested provided satisfactory surface smoothness (equivalent to that of particleboard) except for the sample of 0.76 mm strand core having a relatively low fine addition of 20%.

Laminated MDF and particleboard are being employed successfully as interior grade decorative panels. They are exposed to cycling temperatures and humidities, for example, in bathroom applications. It was postulated that a laminated OSB panel which retains a surface smoothness comparable to that of laminated MDF and particleboard controls during accelerated aging conditions may be utilized for any indoor application. Table 3 compares the surface smoothness test results for the samples aged for 0 h, 50 h and 140 h at 50° C. and 90% RH. The 50 h treatment clearly produced telegraphing of fibre or wood particles for the particleboard and MDF controls. These panels would no longer be acceptable for applications where a high quality surface finish is required. Consequently, laminated OSB which can withstand the 50 h treatment may be acceptable for most indoor applications from a surface durability point of view. For the OSB made of 0.76 mm trembling aspen or 0.50 mm white birch strands, results in Table 3 indicated that under our experimental conditions, panels with 40–50% pre-pressed fines and steam pressing had no telegraphing or surface roughening due to uneven swelling of strands. For the panels produced from 0.38 mm aspen strands, excellent results were obtained with 40% pre-pressed fines without steam injection pressing.

Figure 1:
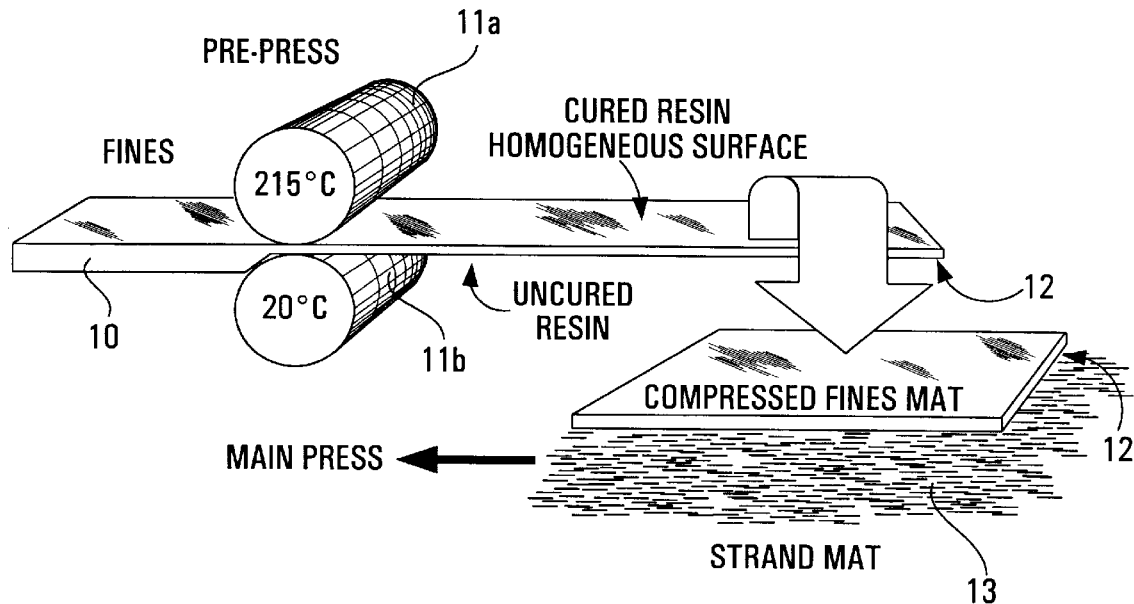
FIG. 1 is a somewhat schematic representation of an apparatus system for producing smooth surfaced OSB panels in accordance with the methods of the present invention.

In the apparatus system shown in FIG. 1 in schematic form, the fines mat 10 is fed in continuous form between a pair of compression rollers 11a, 11b, the roller 11a being heated to a temperature of 215° C. whereas the lower roller 11b is unheated, being at room temperature of approximately 20° C. The thickness of the fines mat 10 will vary according to the required application, but typically is between about 15 mm and about 40 mm before passing through the rollers.

The speed of advance of the mat 10 between the rollers will depend upon the roller temperature, the curing temperature of the resin, and the extent to which the resin is to be cured. It is essential that the smooth-surfaced heated upper roller 11a produces a high quality smooth surface on the upper side of the fines mat 10.

The underside of the compressed fines mat is applied as indicated by the arrow 12 against the upper side of an oriented strand board mat 13 which is advanced to a main press (not shown) where under conditions of heat and pressure the two mats are laminated together to produce the smooth surfaced product. Although not indicated in FIG. 1, it is clear that if desired, a second compressed fines mat could be applied to the opposite side of the OSB mat simultaneously.

We claim:

1. A method for producing an oriented strand board panel with a surface having a high degree of surface smoothness, comprising the steps of:

a) producing a first mat of oriented strand board of predetermined thickness;

b) producing a second mat of fines and resin, said second mat being of lesser thickness than said first mat;

c) pressing said second mat with the application of heat to one side thereof to produce a smooth surface on said one side, and to cure resin at and adjacent said one side while resin at and adjacent the opposite side remains uncured and reactive;

d) applying said second mat from step c) with said opposite side thereof against one side of said first mat under conditions of pressure and heat to effect bonding together of said two mats and curing of resin therein to create a laminated panel.

2. A method as claimed in claim 1, wherein in step d) said second mat is applied to said first mat with the utilization of steam injection pressing.

3. A method as claimed in claim 1, wherein a third mat comprising fines and resin is produced and processed in the same manner as said second mat, said third mat being applied to the opposite side of said first mat as in step d) above to create a laminated panel having opposite surfaces each having a high degree of smoothness.

4. A method as claimed in claim 1, wherein said first mat comprises a mixture of wood strands and reactive resin, at least a major part of the reactive resin of said first mat being cured prior to step d) above.

5. A method as claimed in claim 1, wherein step c) is performed by passing said second mat between a pair of closely spaced rollers, one said roller being heated to a temperature that is sufficient to cure resin at and adjacent the corresponding side of said second mat, the other roller being unheated.

6. A method as claimed in claims 1, wherein said first mat comprises wood strands having an average thickness of about 0.76 mm, and the fines content of the laminated panel is at least about 15% by weight.

7. A method as claimed in claim 1, wherein said first mat comprises wood strands having an average thickness of about 0.20 mm, and the fines content of the laminated panel is at least about 10% by weight.

8. A method as claimed in claim 5, wherein said second mat is produced in continuous form and is cut into panel-sized lengths after passing through said pair of rollers.

9. A method as claimed in claim 1, wherein said first mat has a resin content of 0.5 to 10%, and comprises strands of a thickness between about 0.20 to 1.0 mm, a length of between 25 mm and 300 mm and a width of between about 10 mm and 50 mm.

10. A method as claimed in claim 9, wherein from about 20% to 80% of said fines have a particle size that is smaller than 850 $\mu$m.

11. A method as claimed in claim 10, wherein at least 40% of said fines have a particle size that is smaller than 850 $\mu$m.

12. A method as claimed in claim 1, wherein said second mat has a resin content of between about 2% and 12%.

13. A method as claimed in claim 12, wherein said second mat has a resin content of between about 5% and 8%.

14. A method for producing a smooth-surfaced uniform mat of high density made from bonded wood fines selected from particles, fibers and strands, said method comprising:

mixing said fines with an adhesive to provide a mixture, and spreading said mixture to form a generally uniform layer mat;

said layer formed by pressing one surface of said uniform layer mat against a smooth-surfaced heated element under conditions where the resin on and adjacent said one surface is cured while the resin on and adjacent the opposite surface of the mat remains uncured.

15. A method as claimed in claim 14 wherein said mat is produced in continuous form, said heated element comprising a roller against which the mat is compressed by an unheated counter roller, the mat being subsequently cut into desired sizes after passing between said rollers.

16. A method as claimed in claim 14 wherein said mat has a resin content of between about 2% and 12% and wherein from about 20% to 80% of said fines have a particle size that is smaller than 850 µm.

17. A method as claimed in claim 16 wherein said mat has a resin content of between about 5% and 8% and wherein at least 40% of said fines have a particle size that is smaller than 850 µm.

* * * * *